No. 11,868. Reissued Nov. 6, 1900.

W. A. BERNARD.

PLIERS.

(Application filed Sept. 22, 1896.)

WITNESSES:

F. Philip Farnsworth

George W. Adam

INVENTOR

William A. Bernard

BY

R. Brison Fisher

ATTORNEYS.

UNITED STATES PATENT OFFICE.

WILLIAM A. BERNARD, OF NEW HAVEN, CONNECTICUT, ASSIGNOR TO THE WM. SCHOLLHORN COMPANY, OF SAME PLACE.

PLIERS

SPECIFICATION forming part of Reissued Letters Patent No. 11,868, dated November 6, 1900.

Original No. 526,479, dated September 25, 1894. Application for reissue filed September 22, 1896. Serial No. 606,691.

*To all whom it may concern:*

Be it known that I, WILLIAM A. BERNARD, a citizen of the United States, residing at New Haven, in the county of New Haven and State of Connecticut, have invented an Improvement in Pliers, (for which Letters Patent have been granted in the following countries: Great Britain, dated May 6, 1890, No. 7,002; France, dated September 1, 1890, No. 205,483; German Empire, dated July 10, 1891, No. 57,617, and Canada, dated January 20, 1891, No. 35,834,) of which the following is a specification.

Pliers have heretofore usually been made with solid handles and jaws; but these are heavy and clumsy, especially with large pliers that are required for light service, and in addition to this it is difficult to proportion the strength of the respective parts, and the joint between the handles is liable to be defective and to give way under strain.

Pliers have been made in which the handles are of sheet metal and struck up hollow and the sheet-metal parts cross each other at the joint and are riveted together either by one rivet passing through the parts or by two rivets in line with each other and joining the respective pairs of crossing plates. Pliers of this character are represented in Letters Patent No. 427,220, granted to me May 6, 1890; but in pliers of this kind the jaws themselves have been made of separate pieces of metal introduced between the sheet metal of the lever-handles.

My present invention relates to pliers in which the jaws are made of sheet metal, as well as the handles, so that only two pieces of metal are necessarily employed in addition to the connecting rivet or rivets, and the jaw-faces are stiffened and strengthened by the sheet metal bent at right angles to the faces and forming back flanges that extend to or are continuations of the sheet-metal parts that cross at the pivot or hinge and are continuations of the hollow sheet-metal handles. By this construction I am enabled to cut out the sheet-metal blanks and stamp the same up to shape in proper dies, so as to require little or no hand-finishing, and the one part is adapted to pass through the opening in the other part and be connected by a cross-rivet, and the pliers are very strong and light.

Figure 1:
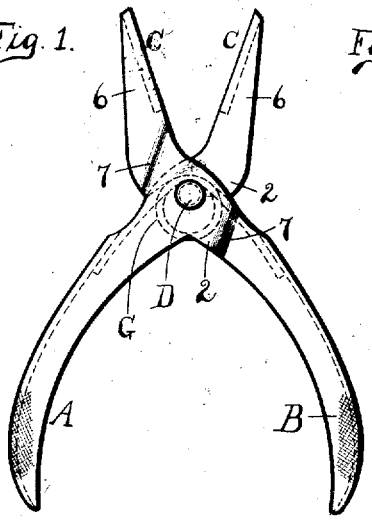
Figure 3:
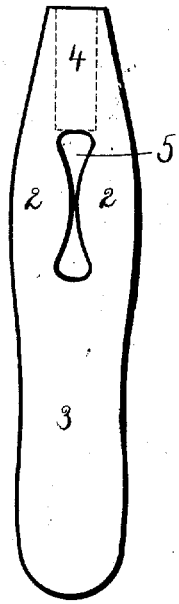
Figure 2:
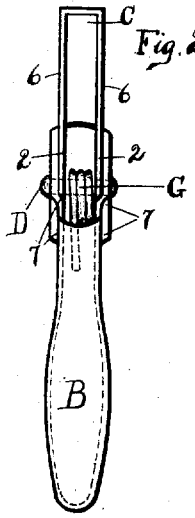
Figure 4:
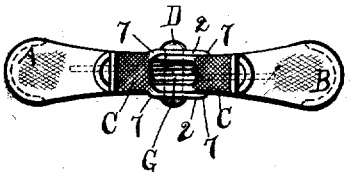
Figure 5:
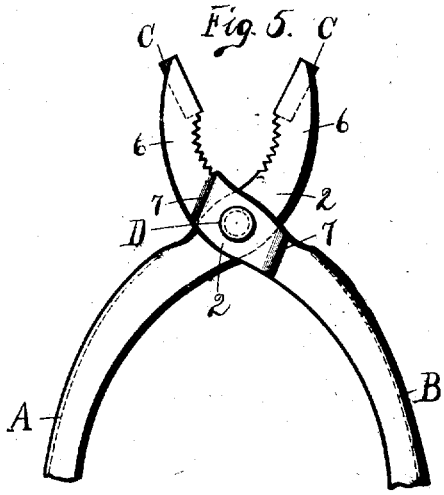

In the drawings, Figure 1 is a side view, and Fig. 2 an edge view, of the pliers complete. Fig. 3 represents the blank made use of as the same is cut out from the sheet-steel or other metal previous to being stamped up to shape in suitable dies. Fig. 4 is a view endwise of the plier-jaws. Fig. 5 shows a modification in the shape of the jaws.

The size, shape, and proportions of the respective parts will vary according to the object for which the pliers may be constructed. In pliers that are used for the needles of knitting-machines the jaws are long and slender. In pliers made use of for wire-workers the jaws will be shorter in proportion to the length of the handles. The mode of constructing the pliers, however, will be apparent from the following description.

The sheet-metal blank will usually be of the same size and shape for the two jaws and handles—that is to say, the portion 3 of the blank will be used for the handles, the portion 2 for the crossing plates through which the pivot-pin or rivet D passes, and the portion 4 is adapted to be formed into a jaw of the desired shape—and there is to be cut through the sheet metal a mortise at 5.

In stamping up the sheet-metal blank the handle portions are concaved or hollowed and may be roughened upon the exterior surface, as usual in plier-handles. The portions 2 of the sheet metal are bent up parallel to each other, so as to form an open mortise, and the portions 4 are bent up so as to form flanges at 6 in the edges of the jaw-faces C, and hence the flanges 6 are continuations of the flat plate portions 2, through which the pivot-pin D passes, and I remark that inasmuch as one jaw has to pass through the mortise between the handle and jaw of the opposite piece it is necessary to spread the plate 2 farther apart between the handle B and jaw C, so that the jaw of the handle A or the handle A itself may be passed through the opening between the plates of the handle B, and with this object in view it is advantageous to bend the sheet metal with offsets at 7 in order that the edges of the jaws may be in line with each other and to facilitate the construction of the parts.

I do not limit myself to any size or shape of handles or jaws, as these may be properly proportioned to adapt the pliers to the desired use, and I remark that the adjacent faces of the jaws may be roughened, as usual in pliers, or be made concave or convex or provided with teeth upon the opposite edges of the sheet-metal flanges, as represented in Fig. 5, so as to adapt the pliers to pipes or round articles.

By placing the coiled spring G between the parts of the handles at the pivot, so that the pivot-pin holds such coil, the ends of the coiled spring will be within the U-shaped sheet metal of the handles and tend to open the pliers, and this is a convenience, especially in pliers that are used for rapid and light work.

By the use of the word "continuation" in this specification I do not intend to limit myself to the integral construction between the jaws and the side plates of the handle.

I claim as my invention—

1. In pliers, the combination with hollow sheet-metal handles having parallel forwardly-extending side plates, the parallel side plates of one handle passing through the mortise-opening of the other handle and being connected by a pivot; of hollow sheet-metal jaws provided with strengthening and stiffening flanges formed at right angles to the jaw-faces and extending back forming a continuation of the parallel side plates of the handle, substantially as described.

2. The pliers made of sheet metal in two parts each part being cut with a mortise and stamped up with a hollow handle and parallel side plates that extend and form edge flanges behind the jaw-faces, the parallel side plates of one handle and jaw passing through the opening between the parallel side plates of the other handle and jaw and being connected by a pivot and the similar jaw-faces coinciding, substantially as specified.

3. The pliers made of sheet metal in two parts each part being cut with a mortise and stamped up with a hollow handle and parallel side plates that extend and form edge flanges behind the jaw-faces, the parallel side plates of one handle and jaw passing through the opening between the parallel side plates of the other handle and jaw and being connected by a pivot and having teeth upon the opposite edges of the parallel side plates and the similar jaw-faces coinciding, substantially as specified.

4. Pliers made of sheet metal in two parts, one part being cut with a mortise and each part having a hollow handle and parallel side plates that extend and form edge flanges behind the jaw-faces, the parallel side plates of one handle and jaw passing through the mortise-opening of the other handle and jaw and being connected by a pivot and the jaw-faces coinciding, substantially as described.

5. The pliers made of sheet metal in two parts each part being cut with a mortise and stamped up with a hollow handle and parallel side plates that extend and form edge flanges behind the jaw-faces, the parallel side plates of one handle and jaw passing through the opening between the parallel side plates of the other handle and jaw and being connected by a pivot, and a spring around the pivot-pin with its ends within the hollow sheet-metal handles, substantially as specified.

In witness whereof I have hereunto set my hand, at New Haven, in the county of New Haven, State of Connecticut, this 21st day of September, 1896.

WILLIAM A. BERNARD.

Witnesses:
JOHN J. HENDERSON,
SAMUEL H. FISHER.